US012774243B2

(12) United States Patent
Nakamura et al.

(10) Patent No.: US 12,774,243 B2
(45) Date of Patent: Oct. 27, 2026

(54) CARRIER-ATTACHED METAL FOIL AND METHOD FOR PRODUCING SAME

(71) Applicant: MITSUI MINING & SMELTING CO., LTD., Tokyo (JP)

(72) Inventors: Toshimi Nakamura, Ageo (JP); Mikiko Komiya, Ageo (JP); Yoshinori Matsuura, Ageo (JP)

(73) Assignee: MITSUI KINZOKU COMPANY, LIMITED, Tokyo (JP)

( * ) Notice: Subject to any disclaimer, the term of this patent is extended or adjusted under 35 U.S.C. 154(b) by 475 days.

(21) Appl. No.: 18/265,836

(22) PCT Filed: Nov. 29, 2021

(86) PCT No.: PCT/JP2021/043664
§ 371 (c)(1),
(2) Date: Jun. 7, 2023

(87) PCT Pub. No.: WO2022/124116
PCT Pub. Date: Jun. 16, 2022

(65) Prior Publication Data

US 2024/0034670 A1 Feb. 1, 2024

(30) Foreign Application Priority Data

Dec. 8, 2020 (JP) ................................ 2020-203188

(51) Int. Cl.
*B32B 15/04* (2006.01)
*B24C 1/04* (2006.01)
(Continued)

(52) U.S. Cl.
CPC .......... *C03C 17/3639* (2013.01); *C03C 19/00* (2013.01); *B32B 15/04* (2013.01); *C03C 2218/154* (2013.01); *C03C 2218/31* (2013.01)

(58) Field of Classification Search
CPC .. C03C 19/00; H05K 2201/0355; B24C 1/04; B24C 11/00; B32B 15/04
See application file for complete search history.

(56) References Cited

U.S. PATENT DOCUMENTS 11,756,845 B2 * 9/2023 Matsuura ................ C03C 17/09 257/668
2005/0048306 A1 3/2005 Suzuki et al.
(Continued)

FOREIGN PATENT DOCUMENTS

JP 2000-331537 11/2000
JP 2005-76091 3/2005
(Continued)

*Primary Examiner* — Adam Krupicka
(74) *Attorney, Agent, or Firm* — GREENBLUM & BERNSTEIN, P.L.C.

(57) ABSTRACT

There is provided a carrier-attached metal foil in which the metal layer is less likely to be released at the ends of the carrier-attached metal foil or in the cutting place(s) of a downsized carrier-attached metal foil, and moreover a decrease in the strength of the carrier is effectively suppressed. This carrier-attached metal foil includes a carrier; a release layer provided on the carrier; and a metal layer having a thickness of 0.01 μm or more and 4.0 μm or less provided on the release layer. The carrier has a flat region having a developed interfacial area ratio Sdr of less than 5%, and an uneven region having a developed interfacial area ratio Sdr of 5% or more and 39% or less, on at least a surface on the metal layer side, and the uneven region is provided in a linear pattern surrounding the flat region.

20 Claims, 4 Drawing Sheets

(51) Int. Cl.

| | |
|---|---|
| ***B24C 11/00*** | (2006.01) |
| ***C03C 17/36*** | (2006.01) |
| ***C03C 19/00*** | (2006.01) |

(56) References Cited

U.S. PATENT DOCUMENTS

| | | | |
|---|---|---|---|
| 2019/0013212 | A1 | 1/2019 | Matsuura |
| 2019/0029125 | A1 | 1/2019 | Matsuura |
| 2020/0278645 | A1 | 9/2020 | Takahashi et al. |
| 2020/0411396 | A1 | 12/2020 | Matsuura et al. |
| 2021/0008838 | A1 | 1/2021 | Ishii |
| 2021/0162680 | A1 | 6/2021 | Nakamura et al. |
| 2021/0347127 | A1 | 11/2021 | Nakamura et al. |

FOREIGN PATENT DOCUMENTS

| | | |
|---|---|---|
| JP | 2016-137727 | 8/2016 |
| JP | 2019-207905 | 12/2019 |
| JP | 2020-139836 | 9/2020 |
| WO | 2014/054812 | 4/2014 |
| WO | 2017/150283 | 9/2017 |
| WO | 2017/150284 | 9/2017 |
| WO | 2019/163605 | 8/2019 |
| WO | 2019/188498 | 10/2019 |
| WO | 2019/198610 | 10/2019 |
| WO | 2020/075802 | 4/2020 |

* cited by examiner

CARRIER-ATTACHED METAL FOIL AND METHOD FOR PRODUCING SAME

TECHNICAL FIELD

The present invention relates to a carrier-attached metal foil and a method for manufacturing the same.

BACKGROUND ART

With the size reduction and functionality enhancement of electronic apparatuses such as portable electronic apparatuses in recent years, further fining (fine pitch) of wiring patterns has been required of printed wiring boards. In order to meet such a requirement, for metal foils for printed wiring board manufacture, those being thinner and having lower surface roughness than before are desired. For example, Patent Literature 1 (JP2005-76091A) discloses a method for manufacturing a carrier-attached superthin copper foil, comprising laminating a release layer and a superthin copper foil in sequence on a smooth surface of a carrier copper foil in which the average surface roughness Rz is reduced to 0.01 μm or more and 2.0 μm or less, and also discloses that high density superfine wiring (fine pattern) is provided by this carrier-attached superthin copper foil to obtain a multilayer printed wiring board.

It has also been recently proposed to use a glass substrate, a polished metal substrate, or the like as an ultrasmooth carrier instead of a conventionally typically used carrier made of a resin and form a metal layer on this ultrasmooth surface by a vapor phase method such as sputtering in order to achieve further reduction of the thickness and surface roughness of a metal layer in a carrier-attached metal foil. For example, Patent Literature 2 (WO2017/150283) discloses a carrier-attached copper foil comprising a carrier (for example, a glass carrier), a release layer, an antireflection layer, and a superthin copper layer in order, and states that the release layer, the antireflection layer, and the superthin copper layer are formed by sputtering. Patent Literature 3 (WO2017/150284) discloses a carrier-attached copper foil comprising a carrier (for example, a glass carrier), intermediate layers (for example, an adhesion metal layer and a release-assisting layer), a release layer, and a superthin copper layer, and states that the intermediate layers, the release layer, and the superthin copper layer are formed by sputtering. In both Patent Literatures 2 and 3, the layers are formed on a carrier such as glass excellent in surface flatness by sputtering, and thus an extremely low arithmetic mean roughness Ra of 1.0 nm or more and 100 nm or less is achieved on the outside surface of the superthin copper layer.

Meanwhile, during the conveyance of a carrier-attached metal foil, and the like, unexpected release of the metal layer may occur by the contact of the laminated portion of the carrier and the metal layer with other members, and several carrier-attached metal foils that can address such a problem are proposed. For example, Patent Literature 4 (JP2016-137727A) discloses a laminate in which part or the whole of the outer peripheries of a metal carrier and a metal foil is covered with a resin, and it is stated that by providing such a configuration, contact with other members can be prevented to reduce the release of the metal foil during handling. Patent Literature 5 (WO2014/054812) discloses a carrier-attached metal foil in which the interface between a carrier made of a resin and a metal foil is strongly adhered via an adhesive layer at least four corners of the outer peripheral region, and thus unexpected release of a corner portion is prevented, and also discloses that after the completion of conveyance, the carrier-attached metal foil is cut in a portion inside the adhesive layer. Patent Literature 6 (JP2000-331537A) discloses a carrier-attached copper foil in which the surface roughness of the portions of a copper foil carrier in the vicinity of the left and right edges is larger than that of the central portion, and it is stated that thus trouble such as the release of the copper layer from the carrier during the handling of the carrier-attached copper foil and during the fabrication of a copper-clad laminate does not occur. Patent Literature 7 (WO2019/163605) discloses that an uneven region having a maximum height Rz of 1.0 μm or more and 30.0 μm or less is linearly provided as a cutting margin on a surface of a flat glass carrier, and it is stated that thus undesirable release of a copper layer during the cutting of a carrier-attached copper foil and after the cutting can be prevented.

CITATION LIST

Patent Literature

Patent Literature 1: JP2005-76091A
Patent Literature 2: WO2017/150283
Patent Literature 3: WO2017/150284
Patent Literature 4: JP2016-137727A
Patent Literature 5: WO2014/054812
Patent Literature 6: JP2000-331537A
Patent Literature 7: WO2019/163605

SUMMARY OF INVENTION

When an IC chip or the like is mounted on a substrate, there is an upper limit to the size of the substrate that can be treated by mounting equipment, and a carrier-attached metal foil of typical size (for example, 400 mm×400 mm) exceeds this upper limit. Therefore, the carrier-attached metal foil is cut and downsized to, for example, a width of about 100 mm so as to have a size that can be treated by mounting equipment. However, when the carrier-attached metal foil is cut, the metal layer may be released from the carrier due to the load during the cutting because the release strength of the release layer exposed at the cutting interface is low. As a result, a problem is that an intended circuit pattern cannot be formed, and it is not possible to proceed to the subsequent steps. In addition, when a $SiO_2$ substrate, a Si single crystal substrate, or glass is used as a carrier, trouble occurs easily such as the occurrence of chipping (chipping in a shell form) at a carrier end during the cutting of a carrier-attached metal foil.

In order to address such problems, the following is considered: as shown in Patent Literature 7, by providing a linear uneven region on a surface of a carrier in a carrier-attached metal foil, the metal layer is made less likely to be released at the ends of the carrier-attached metal foil or in the cutting place(s) of a downsized carrier-attached metal foil. On the other hand, when an uneven region is formed on an originally flat carrier surface by a physical method such as blasting treatment, the strength of the carrier decreases, and as a result, the fear that the cracking of the carrier occurs increases. The carrier in which cracking occurs cannot be used in the subsequent manufacturing process, and therefore yield decrease, the stopping of the process, and the like hinder the mass production of a carrier-attached metal foil, a printed wiring board using the same, or the like. Therefore, from the viewpoint of achieving both the prevention of undesirable release of a metal layer from an end or cutting surface of a carrier-attached metal foil and the prevention of a decrease in the strength of a carrier, there is room for improvement.

The present inventors have now found that by providing as a cutting margin an uneven region in which the developed interfacial area ratio Sdr is controlled in a predetermined range, on an originally flat surface of a carrier in a carrier-attached metal foil, the metal layer is less likely to be released at the ends of the carrier-attached metal foil or in the cutting place(s) of a downsized carrier-attached metal foil, an intended circuit pattern is easily formed, and moreover a decrease in the strength of the carrier is effectively suppressed to allow the carrier-attached metal foil to be desirably used in a mass production process.

Therefore, an object of the present invention is to provide a carrier-attached metal foil in which the metal layer is less likely to be released at the ends of the carrier-attached metal foil or in the cutting place(s) of a downsized carrier-attached metal foil, and therefore an intended circuit pattern is easily formed, and moreover a decrease in the strength of the carrier is effectively suppressed to allow the carrier-attached metal foil to be desirably used in a mass production process.

According to an aspect of the present invention, there is provided a carrier-attached metal foil comprising:

- a carrier;
- a release layer provided on the carrier; and
- a metal layer having a thickness of 0.01 μm or more and 4.0 μm or less provided on the release layer,
- wherein the carrier has a flat region having a developed interfacial area ratio Sdr of less than 5% as measured in accordance with ISO 25178, and an uneven region having a developed interfacial area ratio Sdr of 5% or more and 39% or less as measured in accordance with ISO 25178, on at least a surface on the metal layer side, and wherein the uneven region is provided in a linear pattern surrounding the flat region.

According to another aspect of the present invention, there is provided a method for manufacturing the carrier-attached metal foil, comprising the steps of:

- providing a carrier in which at least one surface is a flat surface having a developed interfacial area ratio Sdr of less than 5% as measured in accordance with ISO 25178;
- performing roughening treatment on at least an outer peripheral portion of a surface of the carrier to form an uneven region having a developed interfacial area ratio Sdr of 5% or more and 39% or less as measured in accordance with ISO 25178 in a linear pattern;
- forming a release layer on the carrier; and
- forming a metal layer having a thickness of 0.01 μm or more and 4.0 μm or less on the release layer.

According to another aspect of the present invention, there is provided a method for manufacturing a carrier-attached metal foil, comprising cutting the carrier-attached metal foil in the uneven region according to the pattern so that the carrier-attached metal foil is divided into pieces.

DESCRIPTION OF EMBODIMENTS

Definitions

The "developed interfacial area ratio Sdr" or "Sdr" herein is a parameter that represents how much the developed area (surface area) of a defined region increases with respect to the area of the defined region, measured in accordance with ISO 25178. The developed interfacial area ratio Sdr is herein represented as an increase (%) in surface area. A smaller value of this indicates a nearly flat surface shape, and the Sdr of a completely flat surface is 0%. On the other hand, a larger value of this indicates a more uneven surface shape. For example, when the Sdr of a surface is 30%, it is indicated that the surface area of this surface increases from that of a completely flat surface by 30%. The developed interfacial area ratio Sdr can be calculated by measuring the surface profile of a predetermined measurement area (for example, a two-dimensional region of 12690 $\mu m^2$) on a surface of interest by a commercially available laser microscope. The numerical value of the developed interfacial area ratio Sdr herein is a value measured without using cutoff by an S filter and an L filter.

Carrier-Attached Metal Foil

Figure 1:
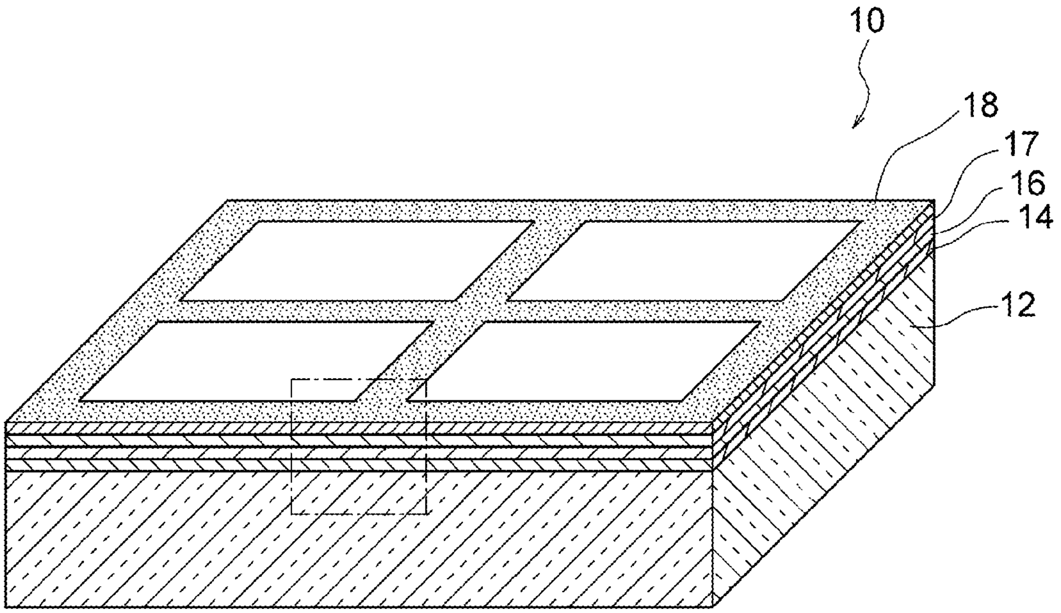
FIG. 1 is a perspective view schematically showing one aspect of the carrier-attached metal foil of the present invention.
Figure 2:
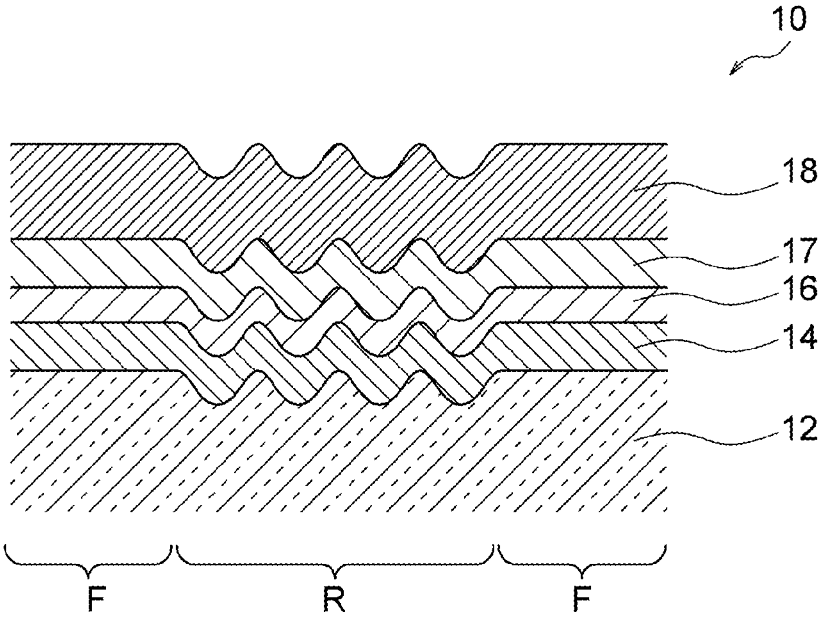
FIG. 2 is a schematic cross-sectional view showing the layer configuration of the portion comprising an uneven region surrounded by the dashed dotted line in the carrier-attached metal foil shown in FIG. 1.
Figure 3:
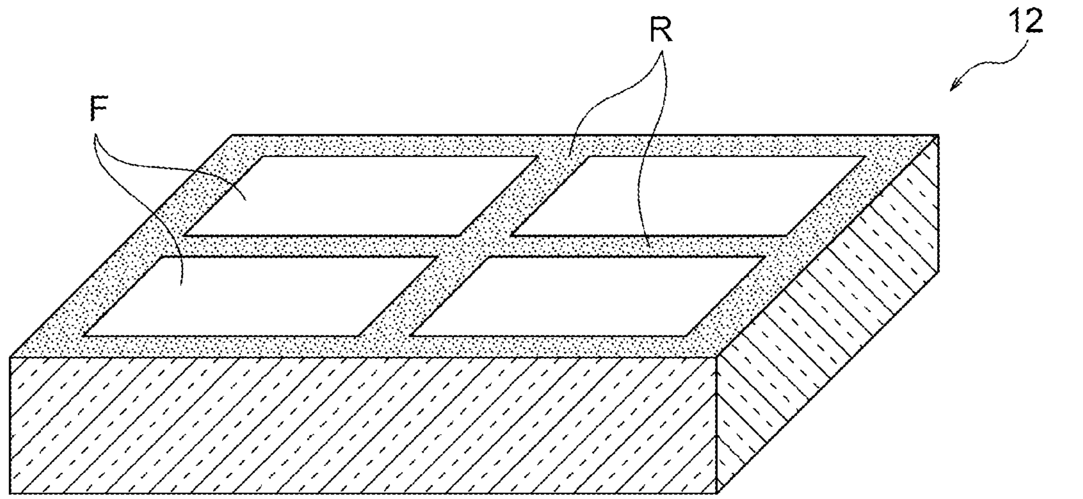
FIG. 3 is a perspective view schematically showing the carrier included in the carrier-attached metal foil shown in FIG. 1.

One example of the carrier-attached metal foil of the present invention is schematically shown in FIGS. 1 and 2. As shown in FIGS. 1 and 2, the carrier-attached metal foil 10 of the present invention comprises a carrier 12, a release layer 16, and a metal layer 18 in this order. The release layer 16 is a layer provided on the carrier 12. The metal layer 18 is a layer provided on the release layer 16 and having a thickness of 0.01 μm or more and 4.0 μm or less. Optionally, the carrier-attached metal foil 10 may further have an intermediate layer 14 that can contribute to the improvement of adhesion, between the carrier 12 and the release layer 16. The carrier-attached metal foil 10 may further have a functional layer 17 that can function as a stopper layer during etching, between the release layer 16 and the metal layer 18. Further, the carrier-attached metal foil 10 may comprise the various layers in order on both surfaces of the carrier 12 so as to be vertically symmetrical. The carrier-attached metal foil 10 should adopt a known layer configuration and is not particularly limited, except that it comprises the carrier 12 in an aspect described later. In any case, in the present invention, as shown in FIGS. 2 and 3, the carrier 12 has one or a plurality of flat regions F having a developed interfacial area ratio Sdr of less than 5%, and an uneven region R having a developed interfacial area ratio Sdr of 5% or more and 39% or less, on at least the surface on the metal layer 18 side. This uneven region R is provided in a linear pattern surrounding the flat region F. The uneven region R may be provided in a linear pattern defining the plurality of flat regions F individualized from each other.

Figure 4:
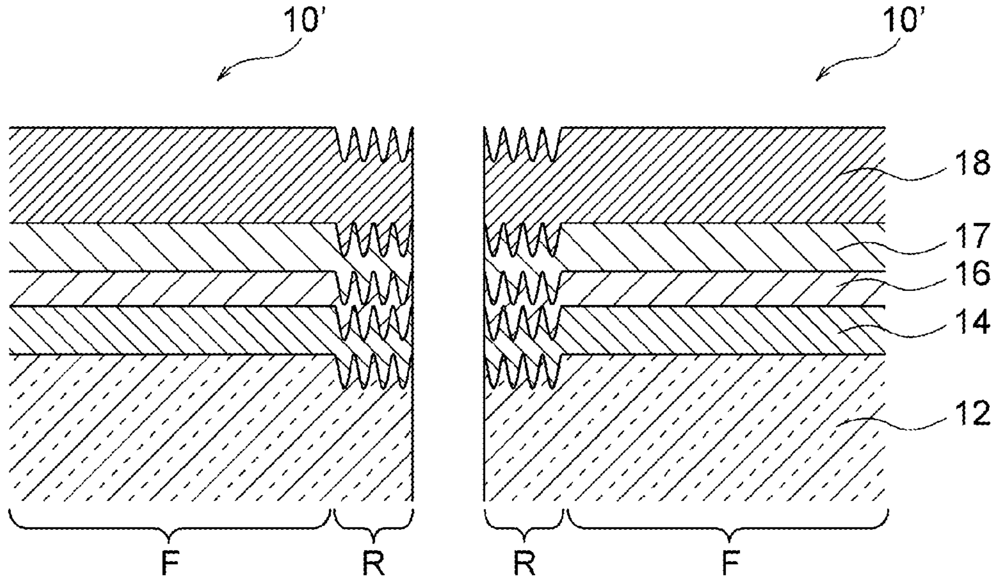
FIG. 4 is a schematic cross-sectional view showing carrier-attached metal foils cut on an uneven region.

By providing the linear uneven region R as a cutting margin on an originally flat surface of the carrier 12 in the carrier-attached metal foil in this manner, the metal layer 18 is less likely to be released at the ends of the carrier-attached metal foil and in the cutting place(s) of a downsized carrier-attached metal foil, and an intended circuit pattern can be formed. In other words, the carrier 12 has the flat region F having a small developed interfacial area ratio Sdr, and thus the surface on the flat region F of the metal layer 18 laminated on the carrier 12 via the release layer 16 also has a flat shape, and this flat surface of the metal layer 18 allows the formation of a fine pattern. The carrier 12 also has the uneven region R having a large developed interfacial area ratio Sdr, and by an anchor effect due to this unevenness, the release strength in the portion formed on the uneven region R of the release layer 16 and the metal layer 18 increases. This uneven region R is formed on at least the outer peripheral portion of the carrier 12 so as to surround the flat region F, and therefore unintended release of the metal layer 18 from an end of the carrier-attached metal foil can be effectively prevented. The uneven region R of the carrier 12 may be provided in a linear form of a pattern defining the plurality of flat regions F individualized from each other, and in such a case, when the carrier-attached metal foil 10 is cut according to the pattern of this uneven region R, it is possible to obtain a plurality of carrier-attached metal foils 10' having the respective flat regions F and downsized to a size that can be treated by circuit mounting equipment in a downstream step. The carrier-attached metal foils 10' obtained by cutting in the uneven region R are shown in FIG. 4. As shown in FIG. 4, in the carrier-attached metal foil 10', a cutting surface is present in the uneven region R, and therefore the release strength of the release layer 16 on the cutting surface is high, and therefore undesirable release of the metal layer 18 from the cutting surface can be extremely effectively prevented not only during the cutting but also after the cutting (for example, during the conveyance of the carrier-attached metal foil in a mounting step and during handling). As a result, an intended circuit pattern is easily formed, and a circuit-mounted substrate having a fine pitch can be desirably achieved.

Therefore, in the carrier-attached metal foil 10 of the present invention, the uneven region R is preferably cut according to the predetermined pattern so that the carrier-attached metal foil 10 is divided into a plurality of pieces, in a manufacturing process. In other words, the carrier-attached metal foil 10 is preferably cut according to the predetermined pattern in the uneven region R and divided into a plurality of pieces when downsizing for circuit mounting is required. According to a preferred aspect of the present invention, there is provided a method for manufacturing a carrier-attached metal foil (that is, the downsized carrier-attached metal foil 10'), comprising cutting the carrier-attached metal foil 10 in the uneven region R according to the pattern so that the carrier-attached metal foil 10 is divided into a plurality of pieces. The cutting of the carrier-attached metal foil 10 should be performed according to a known method and is not particularly limited. Examples of preferred cutting methods include dicing, a water cutter, and a laser cutter.

On the other hand, as described above, when an uneven region is formed on an originally flat carrier surface by a physical method such as blasting treatment, the strength of the carrier decreases, and as a result, there is a fear that the cracking of the carrier occurs. The carrier in which cracking occurs cannot be used in the subsequent manufacturing process and therefore can cause problems that hinder the mass production of a carrier-attached metal foil, a printed wiring board using the same, or the like, such as the stopping of the process and a decrease in product yield. In this manner, it is not easy to achieve both the prevention of undesirable release of a metal layer from an end or cutting surface of a carrier-attached metal foil and the prevention of a decrease in the strength of a carrier. The present inventors have examined in this respect, and as a result, found out that by controlling the Sdr of the uneven region of a carrier in the particular range of 5% or more and 39% or less in a carrier-attached metal foil, a decrease in the strength of the carrier can be effectively suppressed while the release strength between the carrier and the metal layer in the uneven region is significantly improved. The mechanism by which this effect is achieved is not necessarily certain, but an example of one of the factors includes the following: When unevenness is locally present on a flat carrier, compressive stress concentrates on the unevenness, and as a result, the breakage of the carrier is easily caused. In this respect, a region having an Sdr of 5% or more and 39% or less can be said to have uniformly distributed unevenness, and compressive stress disperses, and as a result, the breakage of the carrier is less likely to be caused. Therefore, in the carrier-attached metal foil 10 of the present invention, the cracking of the carrier 12 is less likely to occur, and therefore the carrier-attached metal foil itself can be mass-produced with high productivity, and the carrier-attached metal foil can also be desirably used in the mass production process of a printed wiring board or the like manufactured using the carrier-attached metal foil.

The carrier 12 is preferably a substrate comprising silicon or a glass substrate, more preferably a glass carrier. The substrate comprising silicon may be any substrate as long as it comprises Si as an element. A $SiO_2$ substrate, a SiN substrate, a Si single crystal substrate, a Si polycrystalline substrate, and the like can be applied. The form of the carrier 12 may be any of a sheet, a film, and a plate. The carrier 12 may be a laminate of these sheets, films, plates, and the like. For example, the carrier 12 is preferably one that can function as a support having rigidity, such as a $SiO_2$ substrate, a Si single crystal substrate, or a glass plate. More preferably, from the viewpoint of preventing the warpage of the carrier-attached metal foil 10 in a process involving heating, the carrier 12 is a Si single crystal substrate or a glass plate having a coefficient of thermal expansion (CTE) of less than 25 ppm/K (typically 1.0 ppm/K or more and 23 ppm/K or less). From the viewpoint of handleabililty and ensuring flatness during chip mounting, the micro-Vickers hardness of the carrier 12 is preferably 500 HV or more and 3000 HV or less, more preferably 600 HV or more and 2000 HV or less. When glass is used as the carrier, advantages are that it is lightweight, has a low coefficient of thermal expansion, has high insulating properties, has high rigidity, and has a flat surface and therefore the surface of the metal layer 18 can be extremely smoothed. In addition, when the carrier is glass, advantages are that it is excellent in visibility when image inspection is performed after a wiring layer is formed, that it has surface flatness (coplanarity) advantageous during electronic device mounting, that it has chemical resistance in desmear and various plating steps in a printed wiring board manufacturing process, and that a chemical separation method can be adopted when the carrier 12 is released from the carrier-attached metal foil 10. The carrier 12 is preferably glass comprising $SiO_2$, more preferably glass comprising 50% by weight or more of $SiO_2$, further preferably 60% by weight or more of $SiO_2$. Preferred examples of the glass constituting the carrier 12 include quartz glass, borosilicate glass, alkali-free glass, soda lime glass, aluminosilicate glass, and combinations thereof, more preferably borosilicate glass, alkali-free glass, soda lime glass, and combinations thereof, particularly preferably alkali-free glass, soda lime glass, and combinations thereof, and most preferably alkali-free glass. The carrier 12 is preferably composed of borosilicate glass, alkali-free glass, or soda lime glass because the chipping of the carrier 12 can be reduced when the carrier-attached metal foil 10 is cut. The alkali-free glass is glass containing substantially no alkali metals that comprises silicon dioxide, aluminum oxide, boron oxide, and alkaline earth metal oxides such as calcium oxide and barium oxide as main components and further contains boric acid. An advantage of this alkali-free glass is that it has a low coefficient of thermal expansion in the range of 3 ppm/K or more and 5 ppm/K or less and is stable in a wide temperature zone of 0° C. to 350° C., and therefore the warpage of the glass in a process involving heating can be minimized. The thickness of the carrier 12 is preferably 100 μm or more and 2000 μm or less, more preferably 300 μm or more and 1800 μm or less, and further preferably 400 μm or more and 1100 μm or less. When the carrier 12 has a thickness within such a range, the thinning of a printed wiring board, and the reduction of warpage that occurs during electronic component mounting can be achieved while suitable strength that does not hinder handling is ensured.

The flat region F (each of the plurality of flat regions F when the carrier 12 has the plurality of flat regions F) of the carrier 12 has a developed interfacial area ratio Sdr of less than 5%, preferably 0.01% or more and 4.0% or less, more preferably 0.03% or more and 3.0% or less, further preferably 0.05% or more and 1.0% or less, particularly preferably 0.07% or more and 0.50% or less, and most preferably 0.08% or more and 0.50% or less. The developed interfacial area ratio Sdr of the flat region F smaller in this manner can provide a desirably lower developed interfacial area ratio Sdr on the outermost surface (that is, the surface opposite to the release layer 16) of the metal layer 18 laminated on the carrier 12 and thus is suitable for forming a wiring pattern highly fine to such an extent that the line/space (L/S) is 13 μm or less/13 μm or less (for example, 12 μm/12 μm to 2 μm/2 μm), in a printed wiring board manufactured using the carrier-attached metal foil 10.

The uneven region R of the carrier 12 has a developed interfacial area ratio Sdr of 5% or more and 39% or less, preferably 6% or more and 36% or less, more preferably 7% or more and 32% or less, further preferably 7% or more and 25% or less, and particularly preferably 8% or more and 22% or less. Thus, the ease of being released from the release layer 16 in the uneven region R decreases (the adhesion improves). As a result, unintended release of the metal layer 18 from an end of the carrier-attached metal foil 10 can be effectively prevented. When the carrier 12 has the plurality of flat regions F, the uneven region R is preferably provided in a linear pattern defining the plurality of flat regions F. Thus, when the carrier-attached metal foil 10 is cut according to the pattern of the uneven region R, good release strength on the cutting surface(s) can be ensured, and undesirable release of the metal layer 18 accompanying the cutting can be more effectively suppressed. Further, a pointed portion and a cracked portion are less likely to occur on the carrier 12 surface, and therefore it is possible to reduce the number of the particulate broken pieces of the carrier that occur when the carrier-attached metal foil 10 is cut. Moreover, a decrease in the strength of the carrier 12 can be more effectively suppressed. The release strength of the carrier 12 in the uneven region R is preferably 20 gf/cm or more and 3000 gf/cm or less, more preferably 25 gf/cm or more and 2000 gf/cm or less, further preferably 30 gf/cm or more and 1000 gf/cm or less, particularly preferably 35 gf/cm or more and 500 gf/cm or less, and most preferably 50 gf/cm or more and 300 gf/cm or less. When the release strength of the carrier 12 in the uneven region R is in this range, undesirable release of the metal layer 18 from an end or cutting surface of the carrier-attached metal foil 10 can be effectively suppressed, and the uneven region R can be formed with good productivity. This release strength is a value measured in accordance with JIS Z 0237-2009, as mentioned in Examples described later.

The pattern of the uneven region R is preferably provided in a lattice form, a fence form, or a cross form in terms of easily defining the plurality of flat regions F in an equal shape and size suitable for a circuit-mounted substrate. Especially, the pattern of the uneven region R is particularly preferably provided in a lattice form or a fence form. Thus, the entire or most peripheries of the individual flat regions F can be surrounded by the uneven region R, and therefore the starting point of release is less likely to be caused at the ends of each carrier-attached metal foil 10' divided after cutting.

The line width of the pattern of the uneven region R is preferably 1 mm or more and 50 mm or less, more preferably 1.5 mm or more and 45 mm or less, further preferably 2.0 mm or more and 40 mm or less, and particularly preferably 2.5 mm or more and 35 mm or less. By setting the line width of the pattern of the uneven region R within such a range, the positioning of cutting means such as a cutter in the uneven region R is easily performed, and cutting is also easily performed, and various advantages of the uneven region R can be desirably achieved while much of the flat region F is ensured.

From the viewpoint of sufficiently ensuring a region that can provide the metal layer 18 with flatness necessary for the formation of a fine pattern (that is, the flat region F), the ratio of the area of the uneven region R to the total area of the flat region F and uneven region R of the carrier 12 is preferably 0.01 or more and 0.5 or less, more preferably 0.02 or more and 0.45 or less, further preferably 0.05 or more and 0.40 or less, and particularly preferably 0.1 or more and 0.35 or less.

The optionally provided intermediate layer 14 is a layer interposed between the carrier 12 and the release layer 16 and contributing to ensuring the adhesion between the carrier 12 and the release layer 16. Examples of the metal constituting the intermediate layer 14 include Cu, Ti, Al, Nb, Zr, Cr, W, Ta, Co, Ag, Ni, In, Sn, Zn, Ga, Mo, and combinations thereof (hereinafter referred to as a metal M), preferably Cu, Ti, Al, Nb, Zr, Cr, W, Ta, Co, Ag, Ni, Mo, and combinations thereof, more preferably Cu, Ti, Zr, Al, Cr, W, Ni, Mo, and combinations thereof, further preferably Cu, Ti, Al, Cr, Ni, Mo, and combinations thereof, and particularly preferably Cu, Ti, Al, Ni, and combinations thereof. The intermediate layer 14 may be a pure metal or an alloy. The metal constituting the intermediate layer 14 may comprise unavoidable impurities due to the raw material component, the film formation step, and the like. In the case of exposure to the air after the film formation of the intermediate layer 14, the presence of oxygen mixed due to the exposure is allowed, which is not particularly limited. The upper limit of the content of the metal is not particularly limited and may be 100 atomic %. The intermediate layer 14 is preferably a layer formed by a physical vapor deposition (PVD) method, more preferably a layer formed by sputtering. The intermediate layer 14 is particularly preferably a layer formed by a magnetron sputtering method using a metal target, from the viewpoint of the uniformity of film thickness distribution. The thickness of the intermediate layer 14 is preferably 10 nm or more and 1000 nm or less, more preferably 30 nm or more and 800 nm or less, further preferably 60 nm or more and 600 nm or less, and particularly preferably 100 nm or more and 400 nm or less. By setting such a thickness, an intermediate layer having a roughness equivalent to that of the carrier can be provided. This thickness is a value measured by analyzing a layer cross section by a transmission electron microscope-energy dispersive X-ray spectrometer (TEM-EDX).

The intermediate layer 14 may have a one-layer configuration or a configuration of two or more layers. When the intermediate layer 14 has a one-layer configuration, the intermediate layer 14 is preferably composed of a layer containing a metal composed of Cu, Al, Ti, Ni, or a combination thereof (for example, an alloy or an intermetallic compound) and is more preferably Al, Ti, or a combination thereof (for example, an alloy or an intermetallic compound), further preferably a layer mainly containing Al or a layer mainly containing Ti. On the other hand, when a metal or an alloy that cannot be said to have sufficiently high adhesion to the carrier 12 is adopted for the intermediate layer 14, the intermediate layer 14 preferably has a two-layer configuration. In other words, by providing adjacent to the carrier 12 a layer composed of a metal (for example, Ti) or an alloy excellent in adhesion to the carrier 12, and providing adjacent to the release layer 16 a layer composed of a metal (for example, Cu) or an alloy poor in adhesion to the carrier 12, the adhesion to the carrier 12 can be improved. Therefore, examples of a preferred two-layer configuration of the intermediate layer 14 include a laminated structure composed of a Ti-containing layer adjacent to the carrier 12, and a Cu-containing layer adjacent to the release layer 16. When the constituent elements and balance of thicknesses of the layers of the two-layer configuration are changed, the release strength also changes, and therefore the constituent elements and thicknesses of the layers are preferably appropriately adjusted. The category of the "metal M-containing layer" herein also includes alloys comprising an element other than the metal M in a range that does not impair the releasability of the carrier. Therefore, the intermediate layer 14 can also be referred to as a layer mainly comprising the metal M. In the above respect, the content of the metal M in the intermediate layer 14 is preferably 50 atomic % or more and 100 atomic % or less, more preferably 60 atomic % or more and 100 atomic % or less, further preferably 70 atomic % or more and 100 atomic % or less, particularly preferably 80 atomic % or more and 100 atomic % or less, and most preferably 90 atomic % or more and 100 atomic % or less.

When the intermediate layer 14 is composed of an alloy, examples of preferred alloys include Ni alloys. The Ni alloy preferably has a Ni content of 45% by weight or more and 98% by weight or less, more preferably 55% by weight or more and 90% by weight or less, and further preferably 65% by weight or more and 85% by weight or less. A preferred Ni alloy is an alloy of Ni and at least one selected from the group consisting of Cr, W, Ta, Co, Cu, Ti, Zr, Si, C, Nd, Nb, and La, more preferably an alloy of Ni and at least one selected from the group consisting of Cr, W, Cu, and Si. When the intermediate layer 14 is a Ni alloy layer, it is particularly preferably a layer formed by a magnetron sputtering method using a Ni alloy target, from the viewpoint of the uniformity of film thickness distribution.

The release layer 16 is a layer that allows or facilitates the release of the carrier 12, and the intermediate layer 14 when it is present. The release layer 16 may be either of an organic release layer and an inorganic release layer. Examples of the organic component used for the organic release layer include nitrogen-containing organic compounds, sulfur-containing organic compounds, and carboxylic acids. Examples of the nitrogen-containing organic compounds include triazole compounds and imidazole compounds. On the other hand, examples of the inorganic component used for the inorganic release layer include metal oxides or metal oxynitrides comprising at least one or more of Ni, Mo, Co, Cr, Fe, Ti, W, P, Zn, Cu, Al, Nb, Zr, Ta, Ag, In, Sn, and Ga, or a carbon layer. Among these, particularly, the release layer 16 is preferably a carbon-containing layer, that is, a layer mainly comprising carbon, in terms of ease of release, film-forming properties, and the like, more preferably a layer mainly composed of carbon or a hydrocarbon, and further preferably a layer composed of amorphous carbon, a hard carbon film. In this case, the release layer 16 (that is, a carbon-containing layer) preferably has a carbon concentration of 60 atomic % or more, more preferably 70 atomic % or more, further preferably 80 atomic % or more, and particularly preferably 85 atomic % or more as measured by XPS. The upper limit value of the carbon concentration is not particularly limited and may be 100 atomic % but is practically 98 atomic % or less. The release layer 16 can comprise unavoidable impurities (for example, oxygen and hydrogen derived from the surrounding environment such as an atmosphere). In the release layer 16, metal atoms of types other than the metal contained as the release layer 16 can be mixed due to the film formation method of the functional layer 17 or the metal layer 18. When a carbon-containing layer is used as the release layer 16, the interdiffusivity and reactivity with the carrier are low, and even if the carrier-attached metal foil 10 is subjected to pressing at a temperature of more than 300° C., the formation of metallic bonds between the metal layer and the bonding interface due to high temperature heating can be prevented to maintain a state in which the release and removal of the carrier is easy. This release layer 16 is also preferably a layer formed by a vapor phase method such as sputtering, in terms of suppressing excessive impurities in the release layer 16, and in terms of continuous productivity with the film formation of the optionally provided intermediate layer 14, and the like. The thickness when a carbon-containing layer is used as the release layer 16 is preferably 1 nm or more and 20 nm or less, more preferably 1 nm or more and 10 nm or less. By setting such a thickness, a release layer having a roughness equivalent to that of the carrier and having a release function can be provided. This thickness is a value measured by analyzing a layer cross section by a transmission electron microscope-energy dispersive X-ray spectrometer (TEM-EDX).

The release layer 16 may comprise each layer of a metal oxide layer and a carbon-containing layer or be a layer comprising both a metal oxide and carbon. Particularly, when the carrier-attached metal foil 10 comprises the intermediate layer 14, the carbon-containing layer can contribute to the stable release of the carrier 12, and the metal oxide layer can suppress the diffusion of the metal elements derived from the intermediate layer 14 and the metal layer 18, accompanying heating. As a result, even after the carrier-attached metal foil 10 is heated at a temperature as high as, for example, 350° C. or more, stable releasability can be maintained. The metal oxide layer is preferably a layer comprising an oxide of a metal composed of Cu, Ti, Al, Nb, Zr, Cr, W, Ta, Co, Ag, Ni, In, Sn, Zn, Ga, Mo, or a combination thereof. The metal oxide layer is particularly preferably a layer formed by a reactive sputtering method in which sputtering is performed under an oxidizing atmosphere, using a metal target, in terms of being able to easily control film thickness by the adjustment of film formation time. The thickness of the metal oxide layer is preferably 0.1 nm or more and 100 nm or less. The upper limit value of the thickness of the metal oxide layer is more preferably 60 nm or less, further preferably 30 nm or less, and particularly preferably 10 nm or less. This thickness is a value measured by analyzing a layer cross section by a transmission electron microscope-energy dispersive X-ray spectrometer (TEM-EDX). At this time, the order in which the metal oxide layer and the carbon layer are laminated as the release layer 16 is not particularly limited. The release layer 16 may be present in a state of a mixed phase in which the boundary between the metal oxide layer and the carbon-containing layer is not clearly identified (that is, a layer comprising both a metal oxide and carbon).

Similarly, from the viewpoint of maintaining stable releasability even after heat treatment at high temperature, the release layer 16 may be a metal-containing layer in which the surface on the side adjacent to the metal layer 18 is a fluorination-treated surface and/or a nitriding-treated surface. In the metal-containing layer, a region in which the sum of the content of fluorine and the content of nitrogen is 1.0 atomic % or more (hereinafter referred to as a "(F+N) region") is preferably present over a thickness of 10 nm or more, and the (F+N) region is preferably present on the metal layer 18 side of the metal-containing layer. The thickness (in terms of $SiO_2$) of the (F+N) region is a value specified by performing the depth profile elemental analysis of the carrier-attached metal foil 10 using XPS. The fluorination-treated surface or the nitriding-treated surface can be preferably formed by Reactive ion etching (RIE) or a reactive sputtering method. On the other hand, the metal element included in the metal-containing layer preferably has a negative standard electrode potential. Preferred examples of the metal element included in the metal-containing layer include Cu, Ag, Sn, Zn, Ti, Al, Nb, Zr, W, Ta, Mo, and combinations thereof (for example, alloys and intermetallic compounds). The content of the metal element in the metal-containing layer is preferably 50 atomic % or more and 100 atomic % or less. The metal-containing layer may be a single layer composed of one layer or a multilayer composed of two or more layers. The thickness of the entire metal-containing layer is preferably 10 nm or more and 1000 nm or less, more preferably 30 nm or more and 500 nm or less, further preferably 50 nm or more and 400 nm or less, and particularly preferably 100 nm or more and 300 nm or less. The thickness of the metal-containing layer itself is a value measured by analyzing a layer cross section by a transmission electron microscope-energy dispersive X-ray spectrometer (TEM-EDX).

Alternatively, the release layer 16 may be a metal oxynitride-containing layer instead of the carbon layer and the like. The surface of the metal oxynitride-containing layer opposite to the carrier 12 (that is, on the metal layer 18 side) preferably comprises at least one metal oxynitride selected from the group consisting of TaON, NiON, TiON, NiWON, and MoON. In terms of ensuring the adhesion between the carrier 12 and the metal layer 18, the surface of the metal oxynitride-containing layer on the carrier 12 side preferably comprises at least one selected from the group consisting of Cu, Ti, Ta, Cr, Ni, Al, Mo, Zn, W, TiN, and TaN. Thus, the number of foreign matter particles on the metal layer 18 surface is suppressed to improve circuit-forming properties, and even after the carrier-attached metal foil 10 is heated at high temperature for a long time, stable release strength can be maintained. The thickness of the metal oxynitride-containing layer is preferably 5 nm or more and 500 nm or less, more preferably 10 nm or more and 400 nm or less, further preferably 20 nm or more and 200 nm or less, and particularly preferably 30 nm or more and 100 nm or less. This thickness is a value measured by analyzing a layer cross section by a transmission electron microscope-energy dispersive X-ray spectrometer (TEM-EDX).

Optionally, the functional layer 17 may be provided between the release layer 16 and the metal layer 18. The functional layer 17 is not particularly limited as long as it provides the desired functions such as an etching stopper function and an antireflection function to the carrier-attached metal foil 10. Preferred examples of the metal constituting the functional layer 17 include Ti, Al, Nb, Zr, Cr, W, Ta, Co, Ag, Ni, Mo, and combinations thereof, more preferably Ti, Zr, Al, Cr, W, Ni, Mo, and combinations thereof, further preferably Ti, Al, Cr, Ni, Mo, and combinations thereof, and particularly preferably Ti, Mo, and combinations thereof. These elements have the property of not dissolving in flash etchants (for example, copper flash etchants) and, as a result, can exhibit excellent chemical resistance to flash etchants. Therefore, the functional layer 17 is a layer less likely to be etched with a flash etchant than the metal layer 18, and therefore can function as an etching stopper layer. In addition, the metal constituting the functional layer 17 also has the function of preventing the reflection of light, and therefore the functional layer 17 can also function as an antireflection layer for improving visibility in image inspection (for example, automatic image inspection (AOI)). The functional layer 17 may be a pure metal or an alloy. The metal constituting the functional layer 17 may comprise unavoidable impurities due to the raw material component, the film formation step, and the like. The upper limit of the content of the metal is not particularly limited and may be 100 atomic %. The functional layer 17 is preferably a layer formed by a physical vapor deposition (PVD) method, more preferably a layer formed by sputtering. The thickness of the functional layer 17 is preferably 1 nm or more and 500 nm or less, more preferably 10 nm or more and 400 nm or less, further preferably 30 nm or more and 300 nm or less, and particularly preferably 50 nm or more and 200 nm or less.

The metal layer 18 is a layer composed of a metal. Preferred examples of the metal constituting the metal layer include Cu, Au, Pt, and combinations thereof (for example, alloys and intermetallic compounds), more preferably Cu, Au, Pt, and combinations thereof, and further preferably Cu. The metal constituting the metal layer 18 may comprise unavoidable impurities due to the raw material component, the film formation step, and the like. The metal layer 18 may be manufactured by any method and may be a metal layer formed, for example, by wet film formation methods such as an electroless metal plating method and an electrolytic metal plating method, physical vapor deposition (PVD) methods such as sputtering and vacuum deposition, chemical vapor film formation, or combinations thereof. The metal layer 18 is particularly preferably a metal layer formed by physical vapor deposition (PVD) methods such as a sputtering method and vacuum deposition, from the viewpoint of being easily adapted to a fine pitch due to super-thinning, and most preferably a metal layer manufactured by a sputtering method. The metal layer 18 is preferably a non-roughened metal layer, but may be one in which secondary roughening occurs by preliminary roughening, soft etching treatment, rinse treatment, or oxidation-reduction treatment, as long as wiring pattern formation during printed wiring board manufacture is not hindered. From the viewpoint of being adapted to a fine pitch as described above, the thickness of the metal layer 18 is 0.01 μm or more and 4.0 μm or less, preferably 0.02 μm or more and 3.0 μm or less, more preferably 0.05 μm or more and 2.5 μm or less, further preferably 0.10 μm or more and 2.0 μm or less, particularly preferably 0.20 μm or more and 1.5 μm or less, and most preferably 0.30 μm or more and 1.2 μm or less. The metal layer 18 having a thickness within such a range is preferably manufactured by a sputtering method from the viewpoint of maintaining the in-plane uniformity of film formation thickness, and improving productivity in a sheet form or a roll form.

The outermost surface of the metal layer 18 preferably has a flat shape corresponding to the surface shape of the flat region F of the carrier 12, and an uneven shape corresponding to the surface shape of the uneven region R of the carrier 12. In other words, as shown in FIGS. 1 and 2, the metal layer 18 is formed, via the intermediate layer 14 (when present), the release layer 16, and the functional layer 17 (when present), on the carrier 12 having the flat region F and the uneven region R, and thus the surface profiles of the flat region F and uneven region R of the carrier 12 are transferred to the surfaces of the layers. Thus, desirable surface profiles corresponding to the shapes of the regions of the carrier 12 are preferably provided to the outermost surface of the metal layer 18 while the uneven shape is transferred to part of the release layer 16. Thus, it is possible to still further prevent the release of the metal layer 18 when the carrier-attached metal foil 10 is cut, and it is possible to be still further adapted to a fine pitch. Typically, the surface having the flat shape corresponding to the flat region F of the carrier 12 (that is, the flat surface) on the outermost surface of the metal layer 18 has a developed interfacial area ratio Sdr of less than 5%, preferably 0.01% or more and 4.0% or less, more preferably 0.03% or more and 3.0% or less, further preferably 0.05% or more and 1.0% or less, and particularly preferably 0.08% or more and 0.50% or less. The surface having the uneven shape corresponding to the uneven region R of the carrier 12 (that is, the uneven surface) on the outermost surface of the metal layer 18 typically has a developed interfacial area ratio Sdr of 5% or more and 39% or less, preferably 6% or more and 36% or less, more preferably 7% or more and 32% or less, further preferably 7% or more and 25% or less, and particularly preferably 8% or more and 22% or less.

The intermediate layer 14 (when present), the release layer 16, the functional layer 17 (when present), and the metal layer 18 are all preferably physical vapor-deposited (PVD) films, that is, films formed by a physical vapor deposition (PVD) method, more preferably sputtered films, that is, films formed by a sputtering method.

The thickness of the entire carrier-attached metal foil 10 is not particularly limited but is preferably 500 μm or more and 3000 μm or less, more preferably 700 μm or more and 2500 μm or less, further preferably 900 μm or more and 2000 μm or less, and particularly preferably 1000 μm or more and 1700 μm or less. The size of the carrier-attached metal foil 10 is not particularly limited but is preferably 10 cm square or more, more preferably 20 cm square or more, and further preferably 25 cm square or more. The upper limit of the size of the carrier-attached metal foil 10 is not particularly limited, and an example of one rough standard of the upper limit includes 1000 cm square. The carrier-attached metal foil 10 is in a form in which the carrier-attached metal foil 10 itself can be handled alone, before and after the formation of wiring.

Method for Manufacturing Carrier-Attached Metal Foil

The carrier-attached metal foil 10 of the present invention can be manufactured by (1) providing a carrier, (2) performing roughening treatment on at least the outer peripheral portion of a carrier surface, and (3) forming various layers such as a release layer and a metal layer on the carrier.

(1) Provision of Carrier

First, the carrier 12 having a flat surface having a developed interfacial area ratio Sdr of less than 5% on at least one surface is provided. This developed interfacial area ratio Sdr is preferably 0.01% or more and 4.0% or less, more preferably 0.03% or more and 3.0% or less, further preferably 0.05% or more and 1.0% or less, particularly preferably 0.07% or more and 0.50% or less, and most preferably 0.08% or more and 0.50% or less. Generally, substrates of $SiO_2$, SiN, Si single crystals, and Si polycrystals, and glass products in a plate form are excellent in flatness, and therefore commercially available $SiO_2$ substrates, SiN substrates, Si single crystal substrates, Si polycrystalline substrates, glass sheets, glass films, and glass plates having a flat surface satisfying Sdr within the range may be used as the carrier 12. Alternatively, by subjecting a carrier 12 surface not satisfying the Sdr to polishing processing by a known method, Sdr within the range may be provided. Preferred materials and characteristics of the carrier 12 are as described above.

(2) Roughening Treatment of Carrier Surface

Next, roughening treatment is performed on at least the outer peripheral portion of a surface of the carrier 12 to form the uneven region R having a developed interfacial area ratio Sdr of 5% or more and 39% or less in a linear pattern. This developed interfacial area ratio Sdr is preferably 6% or more and 36% or less, more preferably 7% or more and 32% or less, further preferably 7% or more and 25% or less, and particularly preferably 8% or more and 22% or less. The roughening treatment is preferably performed on a predetermined region of a surface of the carrier 12 so that the uneven region forms a linear pattern defining a plurality of regions. The roughening treatment should be performed according to a known method, and is not particularly limited as long as the developed interfacial area ratio Sdr within the above range can be achieved, and the uneven region R can be formed in the desired pattern (using masking in combination, as needed). A preferred roughening treatment method is blasting treatment or etching treatment, more preferably blasting treatment, in terms of being able to efficiently form the uneven region R having the desired Sdr.

Roughening treatment by blasting treatment can be performed by projecting a particulate medium (projection material) onto the outer peripheral portion or a predetermined region (that is, a region in which the uneven region R is to be formed) of a surface of the carrier 12 from a nozzle. A preferred size of the nozzle is a width of 0.1 mm or more and 20 mm or less and a length of 100 mm or more and 1000 mm or less, more preferably a width of 3 mm or more and 15 mm or less and a length of 200 mm or more and 800 mm or less, when the discharge port is rectangular. On the other hand, when the discharge port is circular, a preferred size of the nozzle is a diameter of 0.2 mm or more and 50 mm or less, more preferably a diameter of 3 mm or more and 20 mm or less. The particle diameter of the medium is preferably 7 μm or more and 50 μm or less, more preferably 8 μm or more and 35 μm or less. Preferred examples of the material of the medium include alumina, zirconia, silicon carbide, iron, aluminum, zinc, glass, steel, and boron carbide. The Mohs hardness of the medium is preferably 4 or more, more preferably 5.5 or more, and further preferably 6.0 or more. Particularly, by using such a medium, the uneven region R in which the desired Sdr is controlled within the above range can be formed on the surface of the carrier 12. A preferred medium discharge pressure is 0.01 MPa or more and 0.80 MPa or less, more preferably 0.1 MPa or more and 0.50 MPa or less, and further preferably 0.15 MPa or more and 0.25 MPa or less. The blasting treatment time per unit area for the carrier 12 is preferably 0.03 seconds/$cm^2$ or more and 10 seconds/$cm^2$ or less, more preferably 0.1 seconds/$cm^2$ or more and 5 seconds/$cm^2$ or less. Particularly, in terms of easily forming the uneven region R in which the Sdr is controlled within the above range, it is preferred that the medium is mixed with water into the form of a slurry, and this slurry is discharged from the nozzle by pressurized air to perform blasting treatment. By performing roughening treatment (blasting treatment) under the above-described conditions, a decrease in the strength of the carrier after the roughening treatment can be more effectively suppressed.

From this viewpoint, the roughening treatment (for example, blasting treatment) on the carrier 12 surface is preferably performed under conditions in which when the roughening treatment is performed on a region in a frame form having a width of 11 mm and constituting the outer peripheral portion of a surface of an untreated carrier of 300 mm square, the average breaking load of the carrier subjected to the roughening treatment is 61% or more and 120% or less, more preferably 63% or more and 110% or less, and further preferably 70% or more and 100% or less of the average breaking load of the untreated carrier. However, the untreated carrier of 300 mm square is the same as the carrier 12 provided in the (1), except that the untreated carrier is free from the uneven region R and may have a different planar view shape and/or a different size.

On the other hand, preferred examples of roughening treatment by etching treatment include a wet process using a solution comprising hydrofluoric acid, and a dry process by Reactive ion etching (RIE) using a process gas comprising fluorine (for example, $CF_4$ or $SF_6$).

Figure 5:
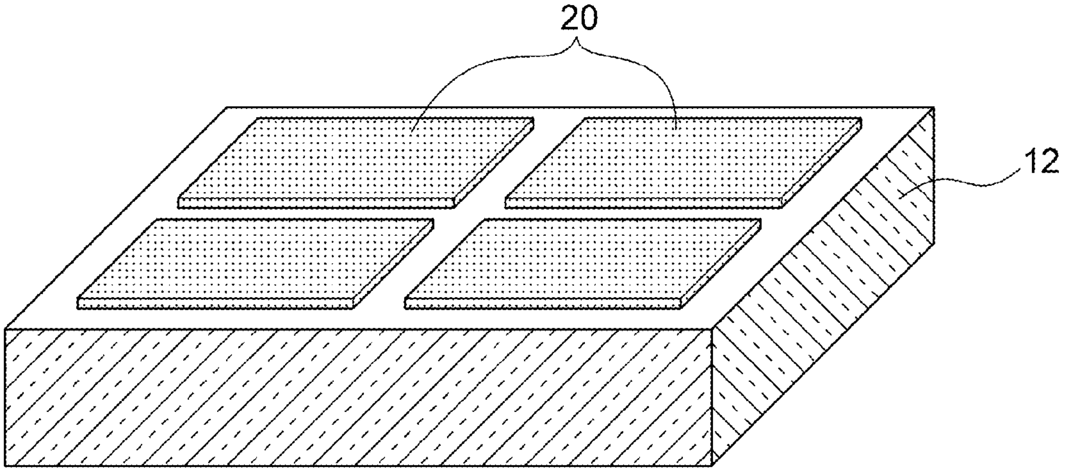
FIG. 5 is a top schematic view showing a carrier on which a masking layer is formed.

In order to selectively perform roughening treatment (especially blasting treatment or etching treatment) on the desired region, masking is preferably used. Specifically, as shown in FIG. 5, a masking layer 20 is preferably formed on portions other than the predetermined region (that is, a region in which the uneven region R is to be formed) of the surface of the carrier 12 before the roughening treatment. In this case, it is desired that the masking layer 20 is removed after the roughening treatment.

(3) Formation of Various Layers on Carrier

Optionally the intermediate layer 14, the release layer 16, optionally the functional layer 17, and the metal layer 18 having a thickness of 0.01 μm or more and 4.0 μm or less are formed on the carrier 12 on which the roughening treatment is performed. The formation of each layer of the intermediate layer 14 (when present), the release layer 16, the functional layer 17 (when present), and the metal layer 18 is preferably performed by a physical vapor deposition (PVD) method from the viewpoint of being easily adapted to a fine pitch due to super-thinning. Examples of the physical vapor deposition (PVD) method include a sputtering method, a vacuum deposition method, and an ion plating method, and most preferably a sputtering method in terms of being able to control film thickness in a wide range such as 0.05 nm or more and 5000 nm or less, and in terms of being able to ensure film thickness uniformity over a wide width or area, and the like. Particularly, by forming all layers of the intermediate layer 14 (when present), the release layer 16, the functional layer 17 (when present), and the metal layer 18 by the sputtering method, the manufacturing efficiency increases significantly. The film formation by the physical vapor deposition (PVD) method should be performed according to known conditions using a known vapor phase film formation apparatus, and is not particularly limited. For example, when the sputtering method is adopted, the sputtering method may include various known methods such as magnetron sputtering, a bipolar sputtering method, and a facing target sputtering method, but magnetron sputtering is preferred in terms of a fast film formation rate and high productivity. The sputtering may be performed with either of DC (direct current) and RF (radio frequency) power supplies. Also for the target shape, a widely known plate type target can be used, but a cylindrical target is desirably used from the viewpoint of target use efficiency. The film formation of each layer of the intermediate layer 14, the release layer 16 (in the case of a carbon-containing layer), the functional layer 17, and the metal layer 18 by a physical vapor deposition (PVD) method (preferably a sputtering method) will be described below.

The film formation of the intermediate layer 14 by a physical vapor deposition (PVD) method (preferably a sputtering method) is preferably performed by magnetron sputtering under a non-oxidizing atmosphere using a target composed of at least one metal selected from the group consisting of Cu, Ti, Al, Nb, Zr, Cr, W, Ta, Co, Ag, Ni, In, Sn, Zn, Ga, and Mo, in terms of being able to improve film thickness distribution uniformity. The purity of the target is preferably 99.9% or more. As the gas used for sputtering, an inert gas such as argon gas is preferably used. The flow rate of argon gas should be appropriately determined according to the sputtering chamber size and the film formation conditions and is not particularly limited. From the viewpoint of continuously performing film formation without poor operation such as abnormal discharge and poor plasma irradiation, the pressure during the film formation is preferably in the range of 0.1 Pa or more and 20 Pa or less. This pressure range should be set by adjusting the film formation power and the flow rate of argon gas according to the apparatus structure, the capacity, the exhaust capacity of the vacuum pump, the rated capacity of the film formation power supply, and the like. The sputtering power should be appropriately set within the range of 0.05 W/$cm^2$ or more and 10.0 W/$cm^2$ or less per unit area of the target considering the film thickness uniformity of the film formation, productivity, and the like.

The film formation of the release layer 16 by a physical vapor deposition (PVD) method (preferably a sputtering method) is preferably performed under an inert atmosphere such as argon using a carbon target. The carbon target is preferably composed of graphite but can comprise unavoidable impurities (for example, oxygen and carbon derived from the surrounding environment such as an atmosphere). The purity of the carbon target is preferably 99.99% or more, more preferably 99.999% or more. From the viewpoint of continuously performing film formation without poor operation such as abnormal discharge and poor plasma irradiation, the pressure during the film formation is preferably in the range of 0.1 Pa or more and 2.0 Pa or less. This pressure range should be set by adjusting the film formation power and the flow rate of argon gas according to the apparatus structure, the capacity, the exhaust capacity of the vacuum pump, the rated capacity of the film formation power supply, and the like. The sputtering power should be appropriately set within the range of 0.05 W/$cm^2$ or more and 10.0 W/$cm^2$ or less per unit area of the target considering the film thickness uniformity of the film formation, productivity, and the like.

The film formation of the functional layer 17 by a physical vapor deposition (PVD) method (preferably a sputtering method) is preferably performed by a magnetron sputtering method using a target composed of at least one metal selected from the group consisting of Ti, Al, Nb, Zr, Cr, W, Ta, Co, Ag, Ni, and Mo. The purity of the target is preferably 99.9% or more. Particularly, the film formation of the functional layer 17 by a magnetron sputtering method is preferably performed under an inert gas atmosphere such as argon at a pressure of 0.1 Pa or more and 20 Pa or less. The sputtering pressure is more preferably 0.2 Pa or more and 15 Pa or less, further preferably 0.3 Pa or more and 10 Pa or less. The control of the pressure range should be performed by adjusting the film formation power and the flow rate of argon gas according to the apparatus structure, the capacity, the exhaust capacity of the vacuum pump, the rated capacity of the film formation power supply, and the like. The flow rate of argon gas should be appropriately determined according to the sputtering chamber size and the film formation conditions and is not particularly limited. The sputtering power should be appropriately set within the range of 1.0 $W/cm^2$ or more and 15.0 $W/cm^2$ or less per unit area of the target considering the film thickness uniformity of the film formation, productivity, and the like. The carrier temperature is preferably kept constant during the film formation in terms of easily obtaining stable film characteristics (for example, film resistance and crystal size). The carrier temperature during the film formation is preferably adjusted within the range of 25° C. or more and 300° C. or less, more preferably 40° C. or more and 200° C. or less, and further preferably 50° C. or more and 150° C. or less.

The film formation of the metal layer 18 by a physical vapor deposition (PVD) method (preferably a sputtering method) is preferably performed under an inert atmosphere such as argon using a target composed of at least one metal selected from the group consisting of Cu, Au, and Pt. The target is preferably composed of a pure metal or an alloy but can comprise unavoidable impurities. The purity of the target is preferably 99.9% or more, more preferably 99.99%, and further preferably 99.999% or more. In order to avoid temperature increase during the vapor phase film formation of the metal layer 18, the cooling mechanism of the stage may be provided in sputtering. From the viewpoint of stably performing film formation without poor operation such as abnormal discharge and poor plasma irradiation, the pressure during the film formation is preferably in the range of 0.1 Pa or more and 2.0 Pa or less. This pressure range should be set by adjusting the film formation power and the flow rate of argon gas according to the apparatus structure, the capacity, the exhaust capacity of the vacuum pump, the rated capacity of the film formation power supply, and the like. The sputtering power should be appropriately set within the range of 0.05 $W/cm^2$ or more and 10.0 $W/cm^2$ or less per unit area of the target considering the film thickness uniformity of the film formation, productivity, and the like.

EXAMPLES

The present invention will be more specifically described by the following Examples.

The developed interfacial area ratio Sdr mentioned in the following Examples is a value measured by a laser microscope (manufactured by Olympus Corporation, OLS5000) in accordance with ISO 25178. Specifically, the surface profile of a region having an area of 12690 $\mu m^2$ on a surface to be measured was measured by the laser microscope by a 100× lens having a numerical aperture (N.A.) of 0.95. Noise removal and primary linear surface inclination correction were performed on the obtained surface profile, and then the measurement of the developed interfacial area ratio Sdr was carried out by surface property analysis. At this time, in the measurement of Sdr, cutoff by an S filter and an L filter was not performed.

Example A1

As shown in FIG. 1, a carrier made of glass was provided as a carrier 12. An uneven region R was formed on this glass carrier, and then an intermediate layer 14 (a Ti-containing layer and a Cu-containing layer), a carbon-containing layer as a release layer 16, a functional layer 17, and a metal layer 18 were formed in this order to fabricate a carrier-attached metal foil 10. The specific procedure is as follows.

(1) Provision of Carrier

A 200 mm×250 mm, 1.1 mm thick glass sheet having a flat surface having a developed interfacial area ratio Sdr of 0.10% (material: soda lime glass, manufactured by Central Glass Co., Ltd.) was provided.

(2) Roughening Treatment of Carrier

As shown in FIG. 5, a masking layer 20 was formed on a carrier 12 surface in a pattern in which four rectangular masking regions were disposed apart from each other with an average line width of 2.5 mm. The formation of this masking layer 20 was performed by roll lamination using a tacky polyvinyl chloride tape (manufactured by LINTEC Corporation, PVC100M M11K). Next, a medium (alumina) having an average particle diameter of 20 μm was projected from a nozzle having a width of 3 mm and a length of 630 mm (the length of the portion overlapping the carrier 12 when seen in a planar view was 200 mm) at a discharge pressure of 0.1 MPa or more and 0.25 MPa or less onto the carrier surface partially covered with the masking layer, using a blasting apparatus (manufactured by Fuji Manufacturing Co., Ltd., product number: SCM-4RBT-05-401), to perform roughening treatment on the exposed portion of the carrier 12. The blasting treatment time per unit area for the carrier 12 was 0.33 $seconds/cm^2$. Thus, the uneven region R having a line width of 2.5 mm on average was formed on the carrier 12 surface in a pattern in a lattice form. Subsequently, the masking layer 20 was removed to expose flat regions F.

(3) Formation of Ti-Containing Layer

A 100 nm thick Ti layer as the Ti-containing layer was formed on the carrier 12 surface on the side on which the roughening treatment was performed, by sputtering with the following apparatus and conditions:

- Apparatus: single-wafer magnetron sputtering apparatus (manufactured by Canon Tokki Corporation, MLS464)
- Target: Ti target (purity 99.999%) having diameter of 8 inches (203.2 mm)
- Ultimate vacuum: less than $1\times10^{-4}$ Pa
- Carrier gas: Ar (flow rate: 100 sccm)
- Sputtering pressure: 0.35 Pa
- Sputtering power: 1000 W (3.1 $W/cm^2$)
- Temperature during film formation: 40° C.

(4) Formation of Cu-Containing Layer

A 100 nm thick Cu layer as the Cu-containing layer was formed on the Ti-containing layer by sputtering with the following apparatus and conditions:

- Apparatus: single-wafer DC sputtering apparatus (manufactured by Canon Tokki Corporation, MLS464)
- Target: Cu target (purity 99.98%) having diameter of 8 inches (203.2 mm)
- Ultimate vacuum: less than $1\times10^{-4}$ Pa
- Carrier gas: Ar (flow rate: 100 sccm)

Sputtering pressure: 0.35 Pa
Sputtering power: 1000 W (6.2 W/cm$^2$)
Temperature during film formation: 40° C.

(5) Formation of Carbon-Containing Layer

A 6 nm thick amorphous carbon layer as the release layer 16 was formed on the Cu-containing layer by sputtering with the following apparatus and conditions:

Apparatus: single-wafer DC sputtering apparatus (manufactured by Canon Tokki Corporation, MLS464)
Target: carbon target (purity 99.999%) having diameter of 8 inches (203.2 mm)
Ultimate vacuum: less than 1×10$^{-4}$ Pa
Carrier gas: Ar (flow rate: 100 sccm)
Sputtering pressure: 0.35 Pa
Sputtering power: 250 W (0.7 W/cm$^2$)
Temperature during film formation: 40° C.

(6) Formation of Functional Layer

A 100 nm thick Ti layer as the functional layer 17 was formed on the surface of the release layer 16 by sputtering with the following apparatus and conditions:

Apparatus: single-wafer DC sputtering apparatus (manufactured by Canon Tokki Corporation, MLS464)
Target: Ti target (purity 99.999%) having diameter of 8 inches (203.2 mm)
Carrier gas: Ar (flow rate: 100 sccm)
Ultimate vacuum: less than 1×10$^{-4}$ Pa
Sputtering pressure: 0.35 Pa
Sputtering power: 1000 W (3.1 W/cm$^2$)

(7) Formation of Metal Layer

A Cu layer having a thickness of 300 nm as the metal layer 18 was formed on the functional layer 17 by sputtering with the following apparatus and conditions to obtain the carrier-attached metal foil 10.

Apparatus: single-wafer DC sputtering apparatus (manufactured by Canon Tokki Corporation, MLS464)
Target: Cu target (purity 99.98%) having diameter of 8 inches (203.2 mm)
Ultimate vacuum: less than 1×10$^{-4}$ Pa
Carrier gas: Ar (flow rate: 100 sccm)
Sputtering pressure: 0.35 Pa
Sputtering power: 1000 W (3.1 W/cm$^2$)
Temperature during film formation: 40° C.

(8) Measurement of Release Strength of Uneven Region

A carrier-attached metal foil in which the entire region of one surface was an uneven region was fabricated in the same manner as the (1) to (7) except that the formation of the masking layer 20 was not performed. 18 μm of Cu was laminated on the metal layer side of this carrier-attached metal foil by electrolytic plating to obtain a measurement sample. For this measurement sample, the release strength (gf/cm) when the electrolytic plating Cu layer was released was measured in accordance with JIS Z 0237-2009 under the conditions of a measurement width of 10 mm, a measurement length of 17 mm, and a release rate of 50 mm/minute. The release strength of the uneven region thus measured was as shown in Table 1.

Examples A2 to A15

A carrier-attached metal foil 10 was fabricated in the same manner as Example A1 except that in the carrier roughening treatment step, the conditions of the blasting treatment were appropriately changed to modify the developed interfacial area ratio Sdr of the uneven region R of the carrier 12. The measurement of the release strength of the uneven region was also performed in the same manner as Example A1. For Examples A2, A5, and A14, the medium was mixed with water into the form of a slurry, and this slurry was discharged from a nozzle by pressurized air to perform blasting treatment (wet blasting).

Evaluation

For the carrier-attached metal foils 10 of Examples A1 to A15 including glass as a carrier, a test for confirming releasability at the ends during dicing cutting was performed. In other words, the carrier-attached metal foil 10 was cut parallel to the linear pattern, using a commercially available dicing apparatus, so as to pass through the center of the uneven region in the line width direction. At this time, the presence or absence or extent of the release of the metal layer 18 at the cutting ends after the dicing was observed and rated by the following criteria. The evaluation results were as shown in Table 1. Table 1 also shows together the developed interfacial area ratio Sdr and the release strength in the uneven region R of the carrier 12.

Evaluation A: No release of the metal layer from the cutting ends was seen.
Evaluation B: Partial release of the metal layer from the cutting ends was seen.
Evaluation C: The release of a large portion of the metal layer from the cutting ends was seen.
Evaluation D: All the metal layer released naturally from the cutting ends before observation.

TABLE 1

| | Uneven region | | Evaluation |
|---|---|---|---|
| | Developed interfacial area ratio Sdr (%) | Release strength (gf/cm) | Release test at cutting ends |
| Ex. A1 | 15 | 38.88 | A |
| Ex. A2 | 14 | 38.91 | A |
| Ex. A3 | 11 | 40.18 | A |
| Ex. A4 | 9 | 41.27 | B |
| Ex. A5 | 21 | 76.38 | A |
| Ex. A6 | 32 | 97.39 | A |
| Ex. A7 | 35 | 101.16 | A |
| Ex. A8 | 38 | 129.20 | A |
| Ex. A9 | 34 | 126.95 | A |
| Ex. A10 | 34 | 114.55 | A |
| Ex. A11 | 7 | 25.26 | C |
| Ex. A12* | 4 | 9.04 | D |
| Ex. A13* | 2 | 1.28 | D |
| Ex. A14* | 1 | 2.97 | D |
| Ex. A15* | 3 | 3.31 | D |

*indicates a Comparative Example.

Examples B1 to B6

These Examples are Experimental Examples verifying the relationship between the developed interfacial area ratio Sdr and mechanical strength of a carrier.

(1) Provision of Carrier

A glass sheet 300 mm square and 1.1 mm thick having a flat surface having a developed interfacial area ratio Sdr of 0.10% (material: soda lime glass, manufactured by Nippon Sheet Glass Co., Ltd.) was provided.

(2) Roughening Treatment of Carrier A masking layer was formed on a carrier 12 surface so as to cover a portion other than the periphery (width 11 mm) of the carrier 12. The formation of this masking layer was performed by cutting a cutting sheet (SPV-3620, manufactured by Nitto Denko Corporation) to 278 mm square using a cutting plotter, and laminating the cut cutting sheet on a carrier 12 surface so that the centers of the cutting sheet and the carrier overlap. Next, a medium (alumina) having a count shown in Table 2 was projected at a discharge pressure shown in Table 2 onto the carrier 12 surface partially covered with the masking layer, using a blasting apparatus (manufactured by Fuji Manufacturing Co., Ltd., product number: SCM-4RBT-05-401), to perform roughening treatment on the exposed portion of the carrier 12. Thus, an uneven region R was formed on the periphery (width 11 mm) of the carrier 12. Subsequently, the masking layer was removed to expose a flat region F. In these Examples, the uneven region R is not provided in a pattern defining a plurality of flat regions F, but it is needless to say that an uneven region in the pattern can be formed on the carrier surface by appropriately changing the masking region.

Example B7 (Comparison)

The same sheet as provided in Examples B1 to B6 was used as a carrier 12 as it was, without performing the roughening treatment of the carrier.

Evaluation

Figure 6A:
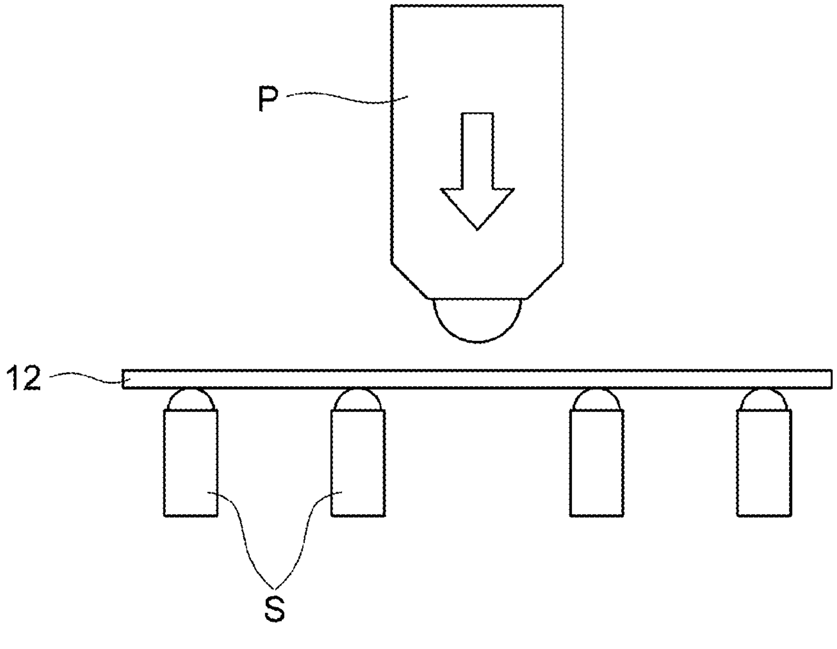
FIG. 6A is a schematic cross-sectional view for explaining a method for measuring a breaking load.
Figure 6B:
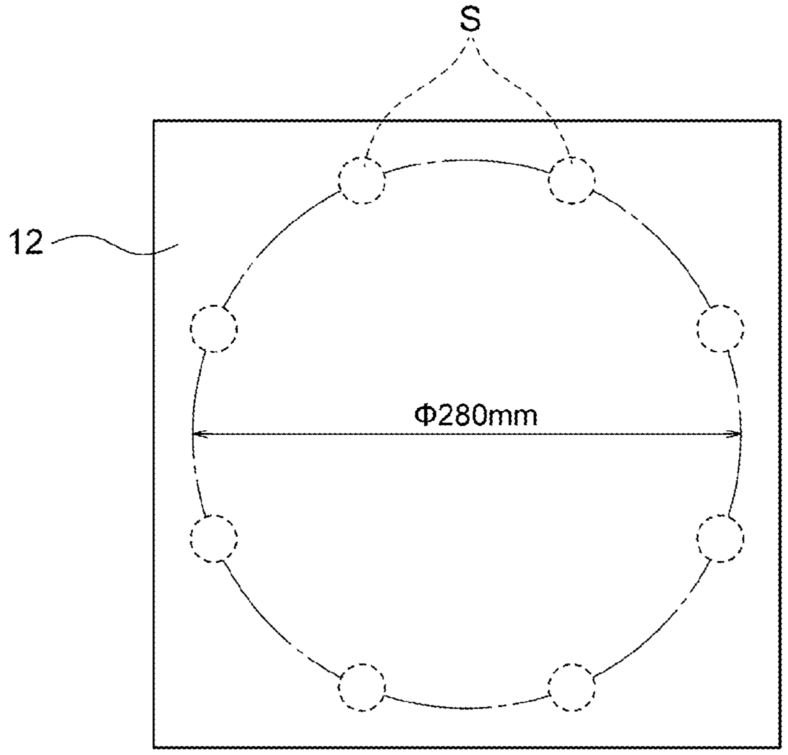
FIG. 6B is a schematic top view showing the positional relationship between the carrier and the supporting members S shown in FIG. 6A.

For the carriers 12 of Examples B1 to B7, the measurement of the breaking load was performed using a universal material tester (manufactured by Instron, product number: 5985). In other words, as shown in FIGS. 6A and 6B, the carrier 12 was placed on eight supporting members S (made of carbon steel for machine structural use S45C, quenching hardness: 50 HRC, radius of curvature of contact portion: 5 mm) disposed at equal intervals in a virtual circle having a diameter of 280 mm. Then, a pushing member P (made of high carbon chromium bearing steel SUJ2, quenching hardness: 67 HRC, radius of curvature of contact portion: 15 mm) was moved in the arrow direction in FIG. 6A and pushed against the central portion of the carrier 12 to break the carrier 12. This measurement was performed on 10 carriers 12 for each Example. A Weibull plot (X axis: breaking load (N), Y axis: cumulative breakage probability (%)) was prepared from the obtained measurement data, and the average breaking load, the 10% breaking load (B10), and the shape parameter were calculated. The results were as shown in Table 2. Table 2 also shows together the percentages of the breaking loads of the glass carriers after the roughening treatment (Examples B1 to B6) to the breaking load of the untreated glass carrier (Example B7).

less than 5% as measured in accordance with ISO 25178, and an uneven region having a developed interfacial area ratio Sdr of 5% or more and 39% or less as measured in accordance with ISO 25178, on at least a surface on the metal layer side, and wherein the uneven region is provided in a linear pattern surrounding the flat region.

2. The carrier-attached metal foil according to claim 1, wherein the carrier has a micro-Vickers hardness of 500 HV or more and 3000 HV or less.

3. The carrier-attached metal foil according to claim 1, wherein an outermost surface of the metal layer has a flat shape corresponding to a surface shape of the flat region of the carrier, and an uneven shape corresponding to a surface shape of the uneven region of the carrier.

4. The carrier-attached metal foil according to claim 1, wherein the metal layer is composed of at least one metal selected from the group consisting of Cu, Au, and Pt.

5. The carrier-attached metal foil according to claim 1, further comprising an intermediate layer between the carrier and the release layer, the intermediate layer comprising at least one metal selected from the group consisting of Cu, Ti, Al, Nb, Zr, Cr, W, Ta, Co, Ag, Ni, In, Sn, Zn, Ga, and Mo.

6. The carrier-attached metal foil according to claim 1, further comprising a functional layer between the release layer and the metal layer, the functional layer being composed of at least one metal selected from the group consisting of Ti, Al, Nb, Zr, Cr, W, Ta, Co, Ag, Ni, and Mo.

7. The carrier-attached metal foil according to claim 1, wherein the carrier is glass comprising $SiO_2$.

8. The carrier-attached metal foil according to claim 1, wherein the carrier is composed of at least one glass selected from the group consisting of quartz glass, borosilicate glass, alkali-free glass, soda lime glass, and aluminosilicate glass.

9. The carrier-attached metal foil according to claim 1, wherein a ratio of an area of the uneven region to a total area of the flat region and the uneven region of the carrier is 0.01 or more and 0.5 or less.

10. The carrier-attached metal foil according to claim 1, wherein the carrier in the uneven region has a release strength of 20 gf/cm or more and 3000 gf/cm or less.

TABLE 2

| | Uneven region | | | Breaking load of carrier | | | Average | B10 |
|---|---|---|---|---|---|---|---|---|
| | Medium count | Discharge pressure (MPa) | Sdr (%) | Average breaking load (N) | B10 (N) | Shape parameter | breaking load change rate (%)* | change rate (%)* |
| Ex. B1* | #80 | 0.2 | 49 | 164.7 | 109.8 | 4.2 | 60.2 | 51.1 |
| Ex. B2* | #150 | 0.2 | 40 | 155.7 | 105.3 | 4.3 | 56.9 | 49.0 |
| Ex. B3 | #220 | 0.2 | 35 | 229.1 | 176.9 | 7.4 | 83.8 | 82.3 |
| Ex. B4 | #400 | 0.4 | 25 | 253.2 | 212.5 | 11.6 | 92.6 | 98.9 |
| Ex. B5 | #600 | 0.4 | 15 | 230.1 | 177.2 | 6.7 | 84.2 | 82.5 |
| Ex. B6 | #800 | 0.4 | 11 | 229.2 | 178.5 | 7.8 | 83.8 | 83.1 |
| Ex. B7* | | No | | 273.4 | 214.8 | 7.9 | 100 | 100 |

*indicates a Comparative Example.
*Average breaking load and B10 are relative values (%) when the value of Ex. B7 using the untreated carrier is 100%.

The invention claimed is:

1. A carrier-attached metal foil comprising:

a carrier;

a release layer provided on the carrier; and a metal layer having a thickness of 0.01 μm or more and 4.0 μm or less provided on the release layer, wherein the carrier has only one flat region, wherein the flat region has a developed interfacial area ratio Sdr of

11. The carrier-attached metal foil according to claim 1, wherein the carrier has an average breaking load of 229.1 N or more and 253.2 N or less.

12. The carrier-attached metal foil according to claim 1, wherein the uneven region is formed by roughening treatment, and wherein the roughening treatment is performed under conditions in which, when the roughening treatment is performed on a region in a frame form having a width of 11 mm and constituting an outer peripheral portion of a surface of an untreated carrier of 300 mm square, an average breaking load of the carrier subjected to the roughening treatment is 61% or more and 120% or less of an average breaking load of the untreated carrier.

13. A method for manufacturing the carrier-attached metal foil according to claim 1, comprising:

providing a carrier in which at least one surface is a flat surface having a developed interfacial area ratio Sdr of less than 5% as measured in accordance with ISO 25178;

performing roughening treatment on at least an outer peripheral portion of a surface of the carrier to form an uneven region having a developed interfacial area ratio Sdr of 5% or more and 39% or less as measured in accordance with ISO 25178 in a linear pattern;

forming a release layer on the carrier; and forming a metal layer having a thickness of 0.01 μm or more and 4.0 μm or less on the release layer.

14. The manufacturing method according to claim 13, wherein the roughening treatment is performed on the surface of the carrier so that the uneven region forms a linear pattern defining a plurality of regions.

15. The manufacturing method according to claim 13, wherein the roughening treatment is performed under conditions in which when the roughening treatment is performed on a region in a frame form having a width of 11 mm and constituting an outer peripheral portion of a surface of an untreated carrier of 300 mm square, an average breaking load of a carrier subjected to the roughening treatment is 61% or more and 120% or less of an average breaking load of the untreated carrier, and wherein the untreated carrier of 300 mm square is the same as the carrier except that the untreated carrier is free from the uneven region and may have a different planar view shape and/or a different size.

16. The manufacturing method according to claim 13, wherein the roughening treatment is a blasting treatment.

17. The manufacturing method according to claim 16, wherein the blasting treatment comprises projecting a medium having a particle diameter of 7 μm or more and 50 μm or less onto the carrier from a nozzle having a width of 0.1 mm or more and 20 mm or less and a length of 100 mm or more and 1000 mm or less at a discharge pressure of 0.01 MPa or more and 0.80 MPa or less.

18. The manufacturing method according to claim 17, wherein the medium is provided in a form of a slurry, and wherein the projecting the medium is performed by discharging the slurry from the nozzle using pressurized air.

19. The manufacturing method according to claim 16, wherein a blasting treatment time per unit area for the carrier is 0.03 seconds/$cm^2$ or more and 10 seconds/$cm^2$ or less.

20. A method for manufacturing a carrier-attached metal foil, comprising cutting the carrier-attached metal foil according to claim 1 in the uneven region according to the pattern so that the carrier-attached metal foil is divided into pieces.

* * * * *